No. 613,467. Patented Nov. 1, 1898.
E. A. NORMAND.
COLLAR AND NECKTIE LOCK.
(Application filed Nov. 17, 1897.)
(No Model.)

Witnesses,

Inventor,
Ernest A. Normand
By Dewey & Co.
Attys

UNITED STATES PATENT OFFICE.

ERNEST A. NORMAND, OF SAN FRANCISCO, CALIFORNIA.

COLLAR AND NECKTIE LOCK.

SPECIFICATION forming part of Letters Patent No. 613,467, dated November 1, 1898.

Application filed November 17, 1897. Serial No. 658,843. (No model.)

*To all whom it may concern:*

Be it known that I, ERNEST A. NORMAND, a citizen of the United States, residing in the city and county of San Francisco, State of California, have invented an Improvement in Collar and Necktie Locks; and I hereby declare the following to be a full, clear, and exact description of the same.

My invention relates to a device which I call a "collar and necktie lock."

It consists in details of construction which will be more fully explained by reference to the accompanying drawings, in which—

Figure 1:
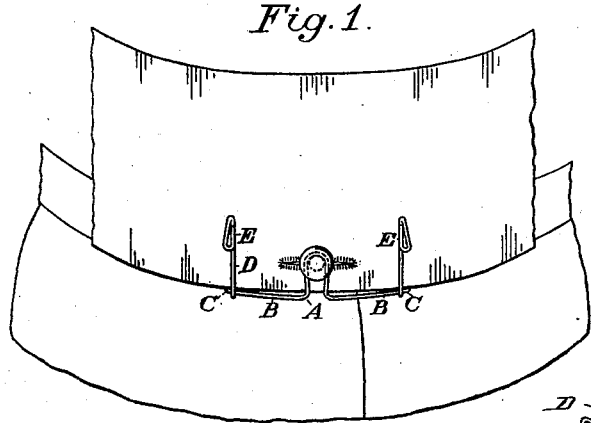
Figure 3:
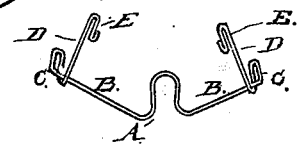
Figure 2:
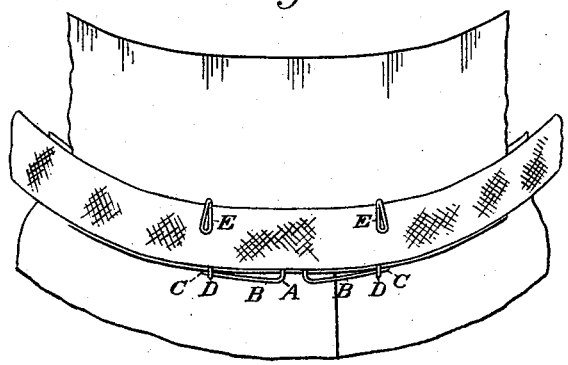

Figure 1 is a view of a portion of a collar and shirt, showing the application of my device. Fig. 2 is a similar view showing the band of a necktie in place. Fig. 3 is a perspective view of the device detached.

The object of my invention is to provide a device which is especially serviceable as a lock to prevent the collar-button from being disengaged from the collar or from the shirt-band when the buttonholes in either have become worn or enlarged, and also to form a lock or holder to prevent the necktie from slipping out of place with relation to the collar.

The device is also serviceable for locking cuffs upon sleeve-buttons and for various other uses of a similar nature.

I have here shown the device as applied to a collar.

The device is formed of light elastic wire and has in the center an upwardly-curved arch A, adapted to fit the shank of the collar-button exterior to the collar. From this arch the wire extends in each direction to form normally-inclined spring members, as shown at B, and is turned upwardly at the ends of these extensions, forming hooks C. These hooks are so situated with relation to the central arch that when the latter is placed over the collar-button the extensions B must be pressed down below the edge of the collar to allow the hooks C to spring up behind it. This alone is a sufficient lock for the collar-button; but the following addition serves also to hold the necktie in place: The wire is for that purpose folded forwardly around the extensions B and extends upwardly at D, terminating in downwardly-curved hooks E, which are at any desired height above the portions B, dependent upon the place where they are to be used.

When used with a collar, this device is first looped over the shank of the collar-button. Then the upturned ends or hooks C are hooked beneath the edge of the collar, thus drawing the central arch A down closely upon the shank of the collar-button and preventing the collar from being pulled off the button, even though the hole is worn so large that the collar could not otherwise be maintained in place. The upturned ends D, with the outwardly-bent hooks E, serve to receive the upper edge of the necktie when the latter is in place, thus holding it in its place with relation to the collar and preventing its slipping up.

The device forms an exceedingly convenient lock for both collar and necktie and is especially useful for retaining them fixed to the buttons.

Having thus described my invention, what I claim as new, and desire to secure by Letters Patent, is—

An improved collar and necktie lock consisting of a single piece of wire bent at its center to form an upwardly-curved arch adapted to fit the shank of the collar-button, said wire being bent in opposite directions from the lower limits of the arch to form spring members normally inclined upwardly and formed with inwardly-projecting hooks, the outer ends of the members thence carried upwardly and downwardly to form outwardly-projecting hooks, said inclined members adapted to be pressed down below the edge of the collar whereby the central arched portion is drawn upon the shank of the button.

In witness whereof I have hereunto set my hand.

ERNEST A. NORMAND.

Witnesses:
S. H. NOURSE,
JESSIE C. BRODIE.